United States Patent [19]
Nakamura

[11] Patent Number: 5,226,635
[45] Date of Patent: Jul. 13, 1993

[54] STRUT FOR A VEHICLE SUSPENSION

[75] Inventor: Michiya Nakamura, Kanagawa, Japan

[73] Assignee: Atsugi Unisia Corporation, Japan

[21] Appl. No.: 831,839

[22] Filed: Feb. 6, 1992

[30] Foreign Application Priority Data

Feb. 21, 1991 [JP] Japan ................ 3-007825[U]

[51] Int. Cl.⁵ .............................................. B60G 13/00
[52] U.S. Cl. .................................... 267/220; 73/118.1
[58] Field of Search ......... 73/118.1, 862.625, 862.627, 73/862.629, 862.636, 862.621; 188/299; 267/220; 280/707

[56] References Cited

U.S. PATENT DOCUMENTS

| | | | |
|---|---|---|---|
| 4,800,751 | 1/1989 | Kobayashi et al. | 73/118.1 |
| 4,828,232 | 5/1989 | Harrod et al. | 267/220 X |
| 5,086,649 | 2/1992 | Yamaoka | 73/118.1 |

FOREIGN PATENT DOCUMENTS 64-60411 3/1989 Japan.

Primary Examiner—Robert J. Oberleitner
Assistant Examiner—Kevin D. Rutherford
Attorney, Agent, or Firm—Ronald P. Kananen

[57] ABSTRACT

A strut for a vehicle suspension includes a strut mount insulator including a rod mount bracket, and a shock absorber including a rod mounted to said rod mount bracket. The rod has a longitudinal axis and a sensor mount surface radially extending with respect to the longitudinal axis. The strut further includes means for providing a positive motion connection between the rod mount bracket and the rod. The positive motion connection providing means includes a load sensor preloaded between said sensor mount surface of the rod and the rod mount bracket of the strut mount insulator. According to the present invention, the positive motion connection providing means includes a spacer disposed between the sensor mount surface and the rod mount bracket.

2 Claims, 2 Drawing Sheets

STRUT FOR A VEHICLE SUSPENSION

BACKGROUND OF THE INVENTION

The present invention relates to a strut for a vehicle suspension, and more particularly to a load sensor mount structure of the strut.

Struts with a load sensor of the piezoelectric type are well known. A known strut comprises a strut mount insulator including a rod mount bracket, and a shock absorber including a rod mounted to the rod mount bracket. The rod has a longitudinal axis and a radially extending sensor mount surface with respect to the longitudinal axis. The strut further comprises a structure for providing a positive motion connection between the rod mount bracket and the rod. This structure includes a load sensor pre-loaded between the sensor mount surface of the rod and the rod mount bracket of the strut mount insulator.

With this known structure, the load sensor sustains all of a load upon tightening nuts for fixing the rod to the rod mount bracket of the strut mount insulator. This force exerted on the load sensor is set as an initial load. As this initial load is large, the load sensor undergoes extremely large distortion upon being subject to an input load during operation of the strut. Accordingly, it is demanded that the load sensor has sufficiently large stiffness and strength. However, the load sensor with large stiffness and strength inevitably posesses a low distortion rate, thus suppressing enhancement of an accuracy in measurement of the input load and narrowing a range of measurement.

SUMMARY OF THE INVENTION

An object of the present invention is to improve a strut for a vehicle suspension such that a load sensor with a large distortion rate can be used and an initial load exerted on the load sensor can be reduced.

According to the present invention, a strut for a vehicle suspension comprises:

a strut mount insulator including a rod mount bracket;

a shock absorber including a rod mounted to said rod mount bracket, said rod having a longitudinal axis and a sensor mount surface radially extending with respect to said longitudinal axis;

means for providing a positive motion connection between said rod mount bracket and said rod;

said positive motion connection providing means including a load sensor pre-loaded between said sensor mount surface of said rod and said rod mount bracket of said strut mount insulator;

wherein said positive motion connection providing means includes a spacer disposed between said sensor mount surface and said rod mount bracket.

DESCRIPTION OF THE PREFERRED EMBODIMENT

Figure 1:
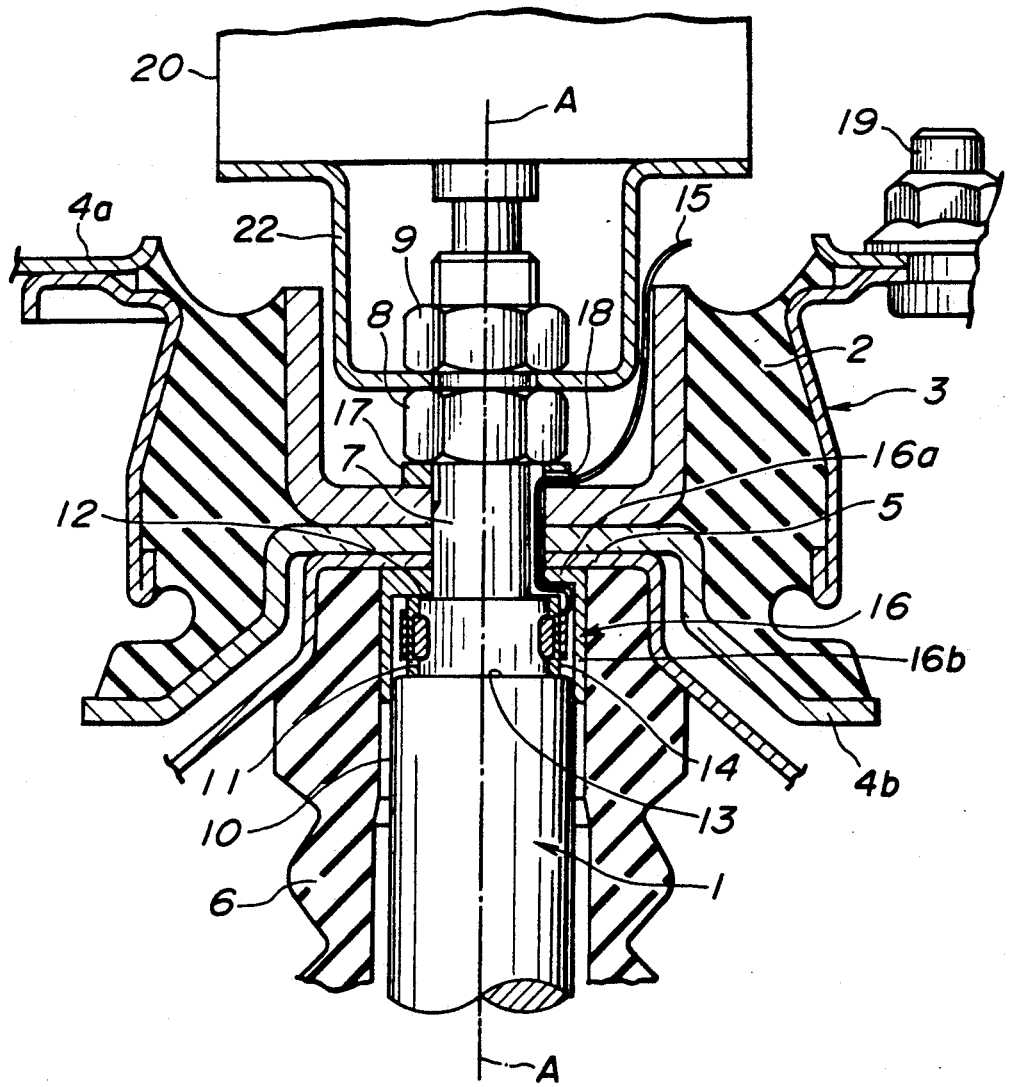
FIG. 1 is an upper portion of a strut for a vehicle suspension partially in section.

Referring now to FIG. 1, an embodiment of a strut according to the present invention comprises a piston rod 1 of a shock absorber and a strut mount insulator 3.

The piston rod 1 has a longitudinal axis A and a main cylindrical portion 10 and a reduced diameter upper end portion 7. Disposed between the main portion 10 and the upper end portion 7 is an integral spacer 11 in the form of an intermediate cylindrical portion that is smaller in diameter than the main portion 10 but larger in diameter than the upper end portion 7. The spacer 11 has an annular shoulder surface 12 which is spaced from a load sensor mount shoulder surface 13, also annular, at which the spacer 11 connects with the main portion 10.

The strut mount insulator 3 has a center opening through which the upper end portion 7 of the piston rod 1 extends. The strut mount insulator 3 includes a vehicle body mount bracket 4a with attachment bolts, one of which is shown at 19, a rod mount bracket 4b, and an insulator rubber 2 between the brackets 4a and 4b.

An annular load sensor 14 using such as a pressure-sensitive or resistance-responsive strain gauge element or the like is fitted onto the spacer 11 of the piston rod 1 and pre-loaded between the shoulder surface 13 and the rod mount bracket 4b. The shoulder surface 13 radially extends with respect to the longitudinal axis A. The load sensor 14 has a lead 15 for transmitting a sensor output signal to a control unit (not shown).

The load sensor 14 is concealed by a cover 16 which has an annular disc portion 16a in a fit relationship with the upper end portion 7, and a cylindrical portion 16b in a fit relationship with the main portion 10 of the piston rod 1. The disc portion 16a has one end which is opposed to the rod mount bracket 4b with an upper spring retainer 5 for a coil suspension spring, not shown, therebetween, and an opposite end which is engaged by an upper end face of the load sensor 14 and the shoulder surface 12. Between the upper spring retainer 5 and the cover 16 is disposed a stopper rubber 6 for damping vibration of a suspension spring (not shown).

The upper end portion 7 is tapped to threadedly engage nuts 8 and 9 with a spacer 17 interposed between the rod mount bracket 4b and the nut 8. For allowing the lead 15 to extend through, the spacer 17 is formed with a channel 18. An actuator 20 is mounted to a bracket 22 interposed between the nuts 8 and 9.

Figure 2:
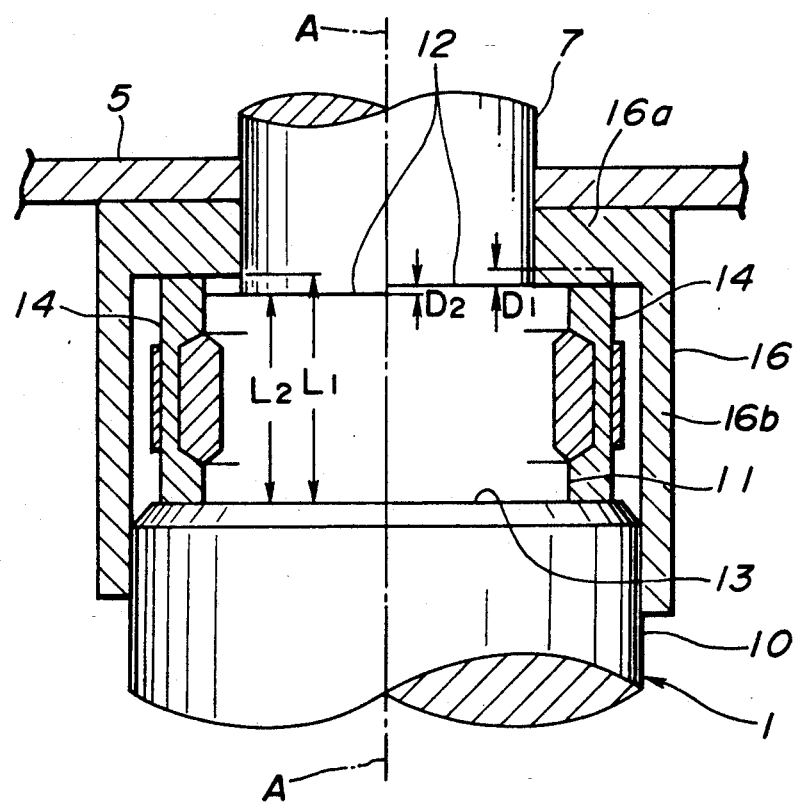
FIG. 2 is a fragmentary enlarged view of FIG. 1, in which a left half portion thereof shows position of parts prior to tightening.

After tightening the nuts 8 and 9, the load sensor 14 is axially compressed while the spacer 11 is axially tensioned. As illustrated by the left half portion of FIG. 2, the load sensor 14 has an axial length $L_1$ and the spacer 11 has an axial length $L_2$ prior to tightening the nuts 8 and 9. After tightening the nuts 8 and 9, the axial length of the load sensor 14 is reduced by a length $D_1$ and the axial length of the spacer 11 is increased by a length $D_2$ until the upper end face of the load sensor 14 becomes flush with the shoulder surface 12 of the spacer 11. Owing to engagement with the annular disc portion 16a of the cover 16 in common, all of load is shared by the load sensor 14 and the spacer 11. In other words, only a portion of the load is transmitted through the load sensor 14. The load sensor 14 is pre-loaded between the disc portion 16a of the cover 16 and the shoulder surface 13. Thus, the load sensor 14 forms a part of a structure which provides a positive motion connection between the rod mount bracket 4b and the piston rod 1.

The shared compression load on the load sensor side serves as an initial load of the load sensor 14. The initial load is determined depending on difference between the axial lengths $L_1$ and $L_2$ of the load sensor 14 and the spacer 11. In order to maintain the load sensor 14 in compressed condition to exert an initial load thereon, a difference between the axial length $L_1$ and $L_2$ must be greater than the length D1 by which the spacer 11 is increased due to tension after tightening. This allows easy adjustment of the amount of initial load to be exerted on the load sensor 14 by suitably selecting the length $L_2$ of the spacer 11 relative to the length $L_1$ of the load sensor 14.

What is claimed is:

1. A strut, for a vehicle suspension, comprising:
   a strut mount insulator including a rod mount bracket;
   a shock absorber including a rod mounted to said rod mount bracket, said rod having a longitudinal axis and having a radially extending sensor mount surface with respect to said longitudinal axis; and
   means for providing a positive motion connection between said rod mount bracket and said rod;
   said positive motion connection providing means including a load sensor pre-loaded between said sensor mount surface of said rod and said rod mount bracket of said strut mount insulator, a spacer formed integrally with said rod and having a shoulder which is spaced along said longitudinal axis from said sensor mount surface by a predetermined distance, and a cover for said sensor having an annular disc portion disposed between said rod mount bracket and said shoulder of said spacer and said sensor;
   wherein said annular disc portion of said cover has one end opposed to said rod mount bracket and an opposite end engaged by said shoulder and said sensor.

2. A strut as claimed in claim 1, wherein said sensor has one end face engaged by said sensor mount surface and an opposite end face engaged by said annular disc portion of said cover, and said opposite end face is spaced from said one end face by a distance longer than said predetermined distance when said sensor is in an unstressed state.

* * * * *